United States Patent
Poon et al.

(10) Patent No.: US 10,282,216 B2
(45) Date of Patent: May 7, 2019

(54) AUTOMATIC IMPORT OF THIRD PARTY ANALYTICS

(71) Applicant: Apptimize, Inc., Menlo Park, CA (US)

(72) Inventors: Michael L. Poon, San Francisco, CA (US); Roberto Carli, Menlo Park, CA (US); James Brandon Koppel, Cambridge, MA (US)

(73) Assignee: Apptimize, Inc., San Francisco, CA (US)

( * ) Notice: Subject to any disclaimer, the term of this patent is extended or adjusted under 35 U.S.C. 154(b) by 0 days.

(21) Appl. No.: 15/211,543

(22) Filed: Jul. 15, 2016

(65) Prior Publication Data

US 2017/0017483 A1    Jan. 19, 2017

Related U.S. Application Data

(60) Provisional application No. 62/193,153, filed on Jul. 16, 2015.

(51) Int. Cl.
   *G06F 9/448* (2018.01)
(52) U.S. Cl.
   CPC .................................. *G06F 9/4484* (2018.02)
(58) Field of Classification Search
   CPC ........................................................ G06F 9/4484
   See application file for complete search history.

(56) References Cited

U.S. PATENT DOCUMENTS

| | | | | | |
|---|---|---|---|---|---|
| 5,964,839 | A | * | 10/1999 | Johnson | G06Q 30/02 702/187 |
| 6,721,941 | B1 | * | 4/2004 | Morshed | G06F 11/3612 709/217 |
| 6,857,119 | B1 | * | 2/2005 | Desai | G06F 8/656 717/145 |
| 8,844,036 | B2 | * | 9/2014 | Saidi | G06F 21/6218 726/1 |
| 2003/0055890 | A1 | * | 3/2003 | Senda | H04N 1/00206 709/203 |
| 2004/0133882 | A1 | * | 7/2004 | Angel | G06F 11/3612 717/130 |
| 2004/0237071 | A1 | * | 11/2004 | Hollander | G06F 9/4425 717/124 |
| 2005/0198624 | A1 | * | 9/2005 | Chipman | G06F 8/443 717/146 |
| 2006/0004833 | A1 | * | 1/2006 | Trivedi | G06F 9/466 |

(Continued)

OTHER PUBLICATIONS

Brian Massey, 5 Simple Ways to Debug Your Google Analytics Installation, Mar. 29, 2013.*

(Continued)

*Primary Examiner* — Jae U Jeon
*Assistant Examiner* — Douglas M Slachta

(57) ABSTRACT

Techniques to facilitate acquisition of analytics data in a mobile application are disclosed herein. In at least one implementation, a software module of the mobile application monitors for an analytics function call from main program code to third party analytics code. The analytics function call is intercepted to redirect the analytics function call to a call handler function. The call handler function processes the analytics function call to extract analytics data from the analytics function call. The analytics function call is then passed to the third party analytics code.

20 Claims, 4 Drawing Sheets

(56) References Cited

U.S. PATENT DOCUMENTS

| | | | |
|---|---|---|---|
| 2006/0190934 A1* | 8/2006 | Kielstra | G06F 9/45516 |
| | | | 717/148 |
| 2010/0251340 A1* | 9/2010 | Martin | G06F 9/541 |
| | | | 726/4 |
| 2012/0204193 A1* | 8/2012 | Nethercutt | G06F 11/3495 |
| | | | 719/330 |
| 2012/0222014 A1* | 8/2012 | Peretz | G06F 11/3684 |
| | | | 717/125 |
| 2013/0263101 A1* | 10/2013 | Dawson | G06F 9/5044 |
| | | | 717/157 |
| 2014/0141875 A1* | 5/2014 | Faria | A63F 13/12 |
| | | | 463/29 |
| 2014/0372515 A1* | 12/2014 | Chow | G06F 17/30902 |
| | | | 709/203 |
| 2015/0058074 A1* | 2/2015 | Fransen | G06Q 30/0201 |
| | | | 705/7.29 |
| 2015/0095874 A1* | 4/2015 | Tapaninen | G06F 9/44521 |
| | | | 717/100 |
| 2015/0127706 A1* | 5/2015 | Li | G06F 8/20 |
| | | | 709/201 |
| 2015/0160931 A1 | 6/2015 | Glazer et al. | |
| 2015/0269234 A1* | 9/2015 | Castellanos | G06F 17/30563 |
| | | | 707/602 |

OTHER PUBLICATIONS

Brian Massey, Is It the Site, or Is It the Analytics? Debugging Google Analytics, May 29, 2014.*

Scott Stricker, Java programming with JNI, Mar. 26, 2002.*

* cited by examiner

AUTOMATIC IMPORT OF THIRD PARTY ANALYTICS

RELATED APPLICATIONS

This application claims the benefit of, and priority to, U.S. Provisional Patent Application No. 62/193,153, entitled "AUTOMATIC IMPORT OF THIRD PARTY ANALYTICS", filed Jul. 16, 2015, which is hereby incorporated by reference in its entirety for all purposes.

TECHNICAL BACKGROUND

Modern computing systems such as smartphones, tablets, and other mobile devices enable users to install and run various applications. Some applications may be configured with analytics engines that are called during the operation of the device. For example, the main program code of a mobile application may be configured to send function calls to an analytics module to collect and process analytics data about how the device is operated.

Computing systems are capable of executing various types and formats of program instruction code associated with an application, including native code and bytecode implementations. Native code may be defined as computer programming instructions that are compiled to run on a particular processor and its instruction set. When executed on its native processor, native code requires no additional processing or interpretation in order to run. Bytecode, also known as portable code, is a more generic form of program instructions designed for execution by a software interpreter. A bytecode program may be executed by parsing and directly executing the instructions individually, line by line. Bytecode programs may be processed and compiled into native code implementations for specific processors and instruction sets to improve efficiency and execution speed.

In the fields of computer hardware and software technology, it is possible in various runtime environments to modify how a method, function, class, or other such software component maps to the actual code implementation of the component. Sometimes referred to as swizzling, such re-mapping technology allows code associated with one function to be replaced by code associated with another function. This may be useful in the context of making modifications to a user interface, for example.

Some implementations of re-mapping technology involve modifying the value of a pointer that points to a location in memory where a method is implemented in code. By changing the value of the pointer, the method can be made to point to other code such that, when the method is called, a different method is employed in its place. The target method that is called in place of the original method is sometimes referred to as a callback function.

Overview

Techniques to facilitate acquisition of analytics data in a mobile application are disclosed herein. In at least one implementation, a software development kit or some other software module installed in the mobile application monitors for an analytics function call from main program code to third party analytics code. The analytics function call is intercepted to redirect the analytics function call to a call handler function. The call handler function processes the analytics function call to extract analytics data from the analytics function call. The analytics function call is then passed to the third party analytics code.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Developers of mobile applications frequently utilize third party analytics tools to track page views, user selections, and other user behavior. Typically, such third party analytics tools are integrated into the code of a mobile application to perform these analytics. The main program code of the application is then configured to call functions provided by the third party analytics code, which often include parameters and other data that the third party analytics code can use to perform the analytics.

In addition to collecting analytics related to user behavior and interactions, mobile application designers often desire to make changes and updates to visual elements and other aspects of the user interface of an application. Ordinarily, such changes would require the application developers to edit program code to implement the new application design requirements. However, a framework can be installed into a mobile application which can receive and interpret changes to visual properties of display elements, providing a quick and easy way for designers to edit the user interface of a mobile application without having to write any programming code. This same framework can be utilized to observe analytics data collected by third party analytics software. The analytics data can then be processed by the application modification framework to present the third party analytics in various reports, including integrated with analytics performed independently by the application modification framework.

Figure 1:
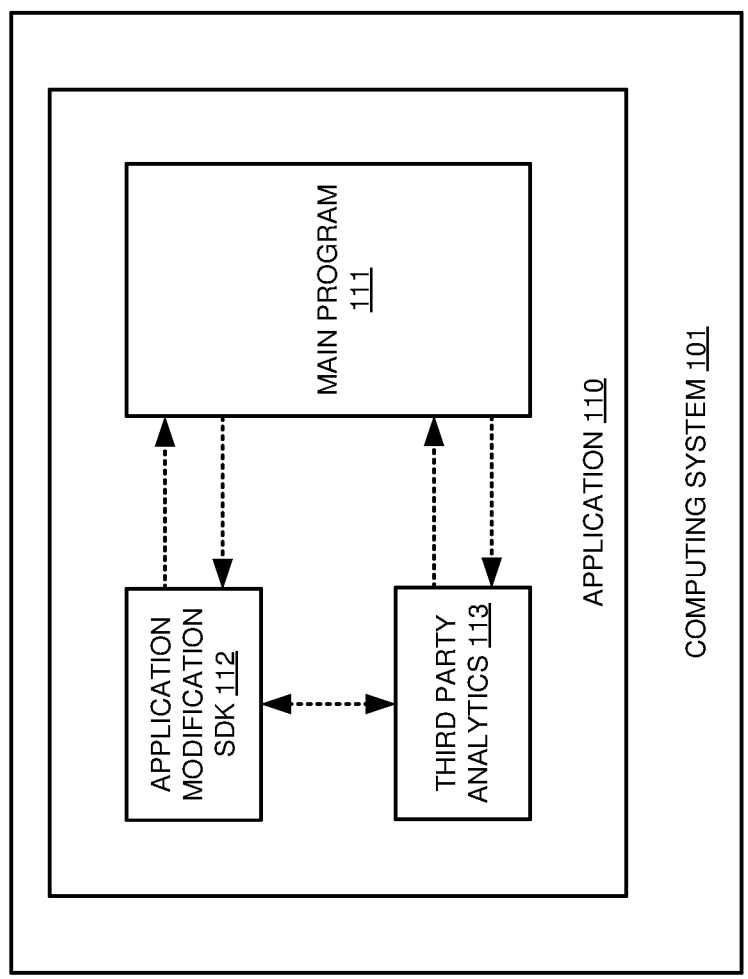
FIG. 1 is a block diagram that illustrates a computing system.
Figure 2:
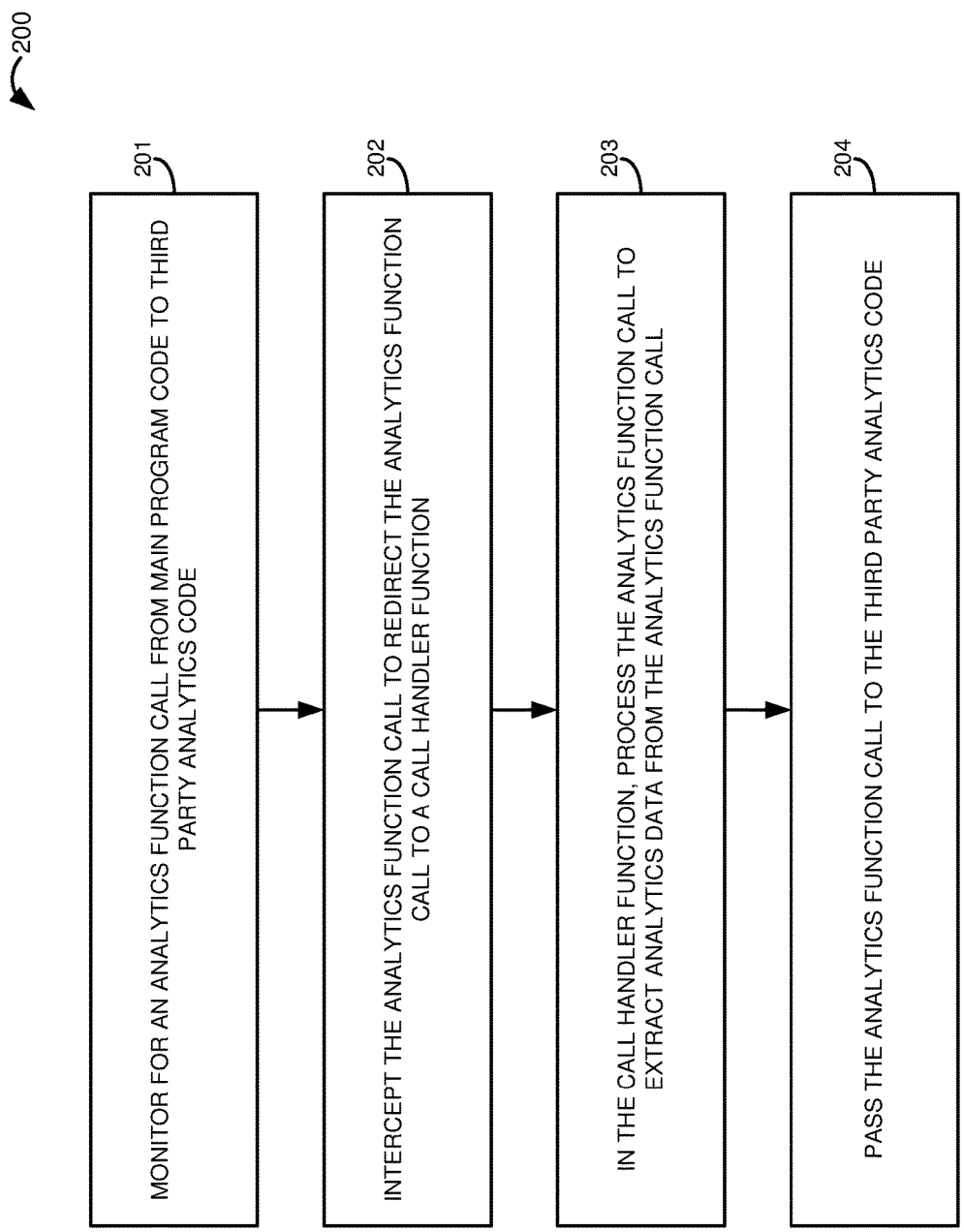
FIG. 2 is a flow diagram that illustrates an operation of the computing system.
Figure 3:
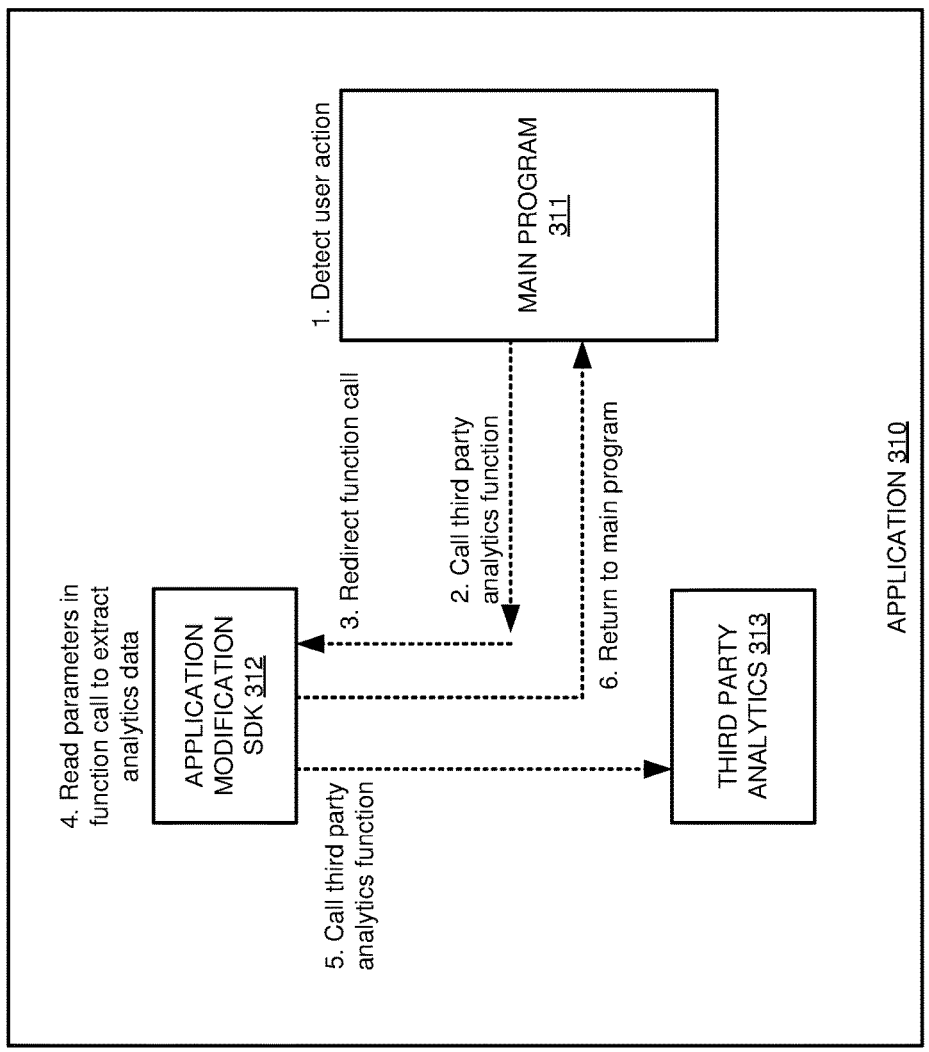
FIG. 3 is a block diagram that illustrates an operation of an application in an exemplary embodiment.
Figure 4:
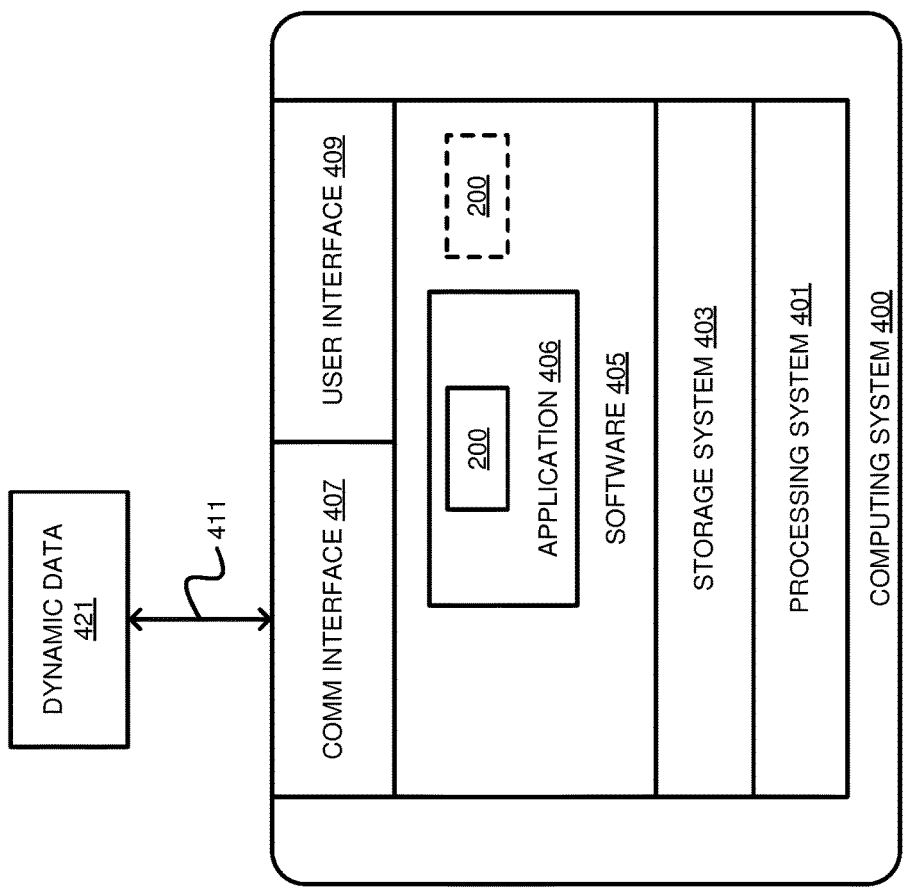
FIG. 4 is a block diagram that illustrates a computing system.

Referring now to the drawings, FIG. 1 illustrates a computing system capable of acquiring analytics data in a mobile application. FIG. 2 is a flow diagram that illustrates an analytics data acquisition process that may be performed by the computing system. FIG. 3 illustrates an operation of an application in an exemplary embodiment. FIG. 4 illustrates an exemplary computing system that may be used to perform any of the data acquisition processes and operational scenarios described herein.

Turning now to FIG. 1, a block diagram of computing system 101 is illustrated. Computing system 101 includes application 110. Application 110 comprises main program 111, application modification software development kit (SDK) 112, and third party analytics 113, which are typically implemented as different software modules of application 110. An operation of computing system 101 when executing application 110 will now be discussed with respect to FIG. 2.

FIG. 2 is a flow diagram that illustrates an operation of communication system 100 in an exemplary implementation. The operation 200 shown in FIG. 2 may also be referred to as analytics data acquisition process 200 herein. The steps of the operation are indicated below parenthetically. The following discussion of operation 200 will proceed with reference to computing system 101 and the elements of application 110 of FIG. 1 in order to illustrate its operations, but note that the details provided in FIG. 1 are merely exemplary and not intended to limit the scope of process 200 to the specific implementation of FIG. 1.

Operation 200 may be employed by computing system 101 to facilitate acquisition of analytics data in a mobile application 110. As shown in the operational flow of FIG. 2, program code integrated into application 110 monitors for an analytics function call from main program code 111 to third party analytics code 113 (201). The analytics function call from the main program code to the third party analytics code is typically triggered by a user interaction with the mobile application. For example, main program 111 commonly sends data to third party analytics 113 for generating analytics whenever a user interaction with application 110 occurs, such as button presses, page navigations, text inputs, user selections, login submissions, purchases, or any other event. Upon receipt of the function calls, third party analytics 113 would then typically collect this data for performing analytics, which could occur in a server or cloud-based computing environment in some examples. In at least one implementation, application modification SDK 112 is installed into the mobile application 110 to facilitate implementing changes to visual elements appearing in the application, among other functionality. In the example of computing system 101, application modification SDK 112 could monitor for the analytics function call from main program 111 to third party analytics 113.

The analytics function call is intercepted and redirected to a call handler function (202). Typically, application modification SDK 112 monitors for and intercepts the analytics function call from main program 111 to third party analytics 113. For example, the application modification SDK 112 could be configured to detect whenever the main program 111 calls an analytics function, intercept the call so that the analytics function is not immediately executed, and instead perform additional operations first. Accordingly, after intercepting the analytics function call, application modification SDK 112 may then redirect the function call to a call handler function within application modification SDK 112 for processing. In at least one implementation, application modification SDK 112 may implement this redirection of the function call by executing a technique known as "hooking" or "swizzling." For example, the third party analytics function 113 may be a hooked function such that when it is called by main program 111, a call handler function within application modification SDK 112 is invoked instead of the code implementation of the third party analytics function 113. Accordingly, a call to the third party analytics function is redirected to a function call handler in the application modification SDK 112 and so that the function call handler is able to perform its own operations.

In one possible implementation, application modification SDK 112 can achieve this function call redirection by modifying metadata associated with the third party analytics function to mark the third party analytics function as native. The native designation in the metadata causes the native code implementation of the function to be called, rather than the bytecode implementation that would require line-by-line processing to translate into a native code implementation. In addition to marking the third party analytics function native, the metadata associated with the third party analytics function may be modified such that the native code that is invoked is the call handler of application modification SDK 112. In at least one implementation, application modification SDK 112 also makes a copy of the bytecode implementation of the third party analytics function, which allows the copy of the function to be executed after the call handler of the application modification SDK 112 performs all configured tasks, without having to execute the actual bytecode implementation of the third party analytics function.

The call handler function of application modification SDK 112 processes the analytics function call to extract analytics data from the analytics function call (203). In at least one implementation, the call handler function reads parameters and other data from the analytics function call to extract the analytics data. In some examples, the call handler function could process the analytics function call to read a string that defines an event and some known payload. For example, the analytics function call could take the form analytics.trade ("login", {"type: email"}), where the event name is defined as "login" and the event payload describes the event properties as "type: email". In another example, an analytics function call of analytics.trade ("purchase", {"amount: 5"}) defines the event name as "purchase" and the event payload as "amount: 5". Any such data in the analytics function call could be extracted in this manner and stored for further processing and inclusion in an analytics report generated by application modification SDK 112 in some examples.

After the call handler function extracts the analytics data from the analytics function call, application modification SDK 112 passes the analytics function call to the third party analytics module 113 (204). In some implementations, a link is established directly between application modification SDK 112 and third party analytics 113, without requiring any additional programming or coding in the main program 111. Typically, application modification SDK 112 calls the analytics function so that third party analytics 113 can serve its role and perform the analytics initially called for by main program 111. In at least one implementation, instead of calling the actual bytecode implementation of the analytics function, application modification SDK 112 calls a copy of the bytecode implementation of the function. After the analytics function call is passed to third party analytics module 113, processing returns to main program 111.

Advantageously, analytics function calls from main program 111 to third party analytics 113 are intercepted and redirected to a call handler function of application modification SDK 112. The analytics data included in an analytics function call is extracted and stored for processing to determine independent analytics on that data. The independent analytics can then be processed by the application modification SDK 112 or some other local or remote system to generate various analytics reports for presentation to the user. Additionally, in some implementations, application modification SDK 112 could include the analytics derived from the analytics function call integrated with analytics performed on independent data that may be gathered separately and in addition to the analytics data extracted from the analytics function call. In this manner, application modification SDK 112 is able to acquire additional analytical data than it may otherwise receive or determine independently.

Referring now to FIG. 3, an operation of a mobile application 310 is illustrated. Mobile application 310 includes main program code 311 which comprises the primary program instructions for the functionality of the application, such as streaming video, social networking, email, instant messaging, weather, navigation, or any other mobile application. Application 310 also includes application modification SDK 312, which is typically installed into application 310 to facilitate changes and updates to a user interface and other visual elements of application 310, perform A/B testing of different application design variants, and other functionality. Finally, application 310 includes third party analytics module 313, which is installed by application developers to assess user behavior when operating application 310 to determine how users are utilizing application 310 and what changes to the design of application 310 could be implemented to improve the ease of use, operability, and other functionality of application 310.

The operational flow of FIG. 3 is indicated by the numerals one through six in this example. Initially, main program 311 detects a relevant user interaction with application 310. Main program 311 is configured to report particular user interactions to the third party analytics module 313 whenever specified events happen, such as button pushes, menu selections, page navigations, text entries, user logins, purchases, subscriptions, sending email or other messages, and any other user actions. Main program 111 therefore calls a third party analytics function and passes data indicating the detected user event intended for delivery to third party analytics module 313.

Instead of third party analytics module 313 receiving the analytics function call, application modification SDK 312 intercepts the function call and redirects the call to itself. Application modification SDK 312 may implement this redirection of the function call by executing a technique known as "hooking" or "swizzling." In this example, the third party analytics function is a hooked function such that when it is called by main program 311, a call handler function within application modification SDK 312 is invoked instead of the code implementation of the third party analytics function. In other words, a call to the third party analytics function is redirected to a call handler in the application modification SDK 312 and so that the call handler is able to perform its own operations. In at least one implementation, this can be achieved by accessing metadata associated with the third party analytics function in order to mark the third party analytics function as native. When a function is marked as native, a native code implementation of the function typically exists already that can be executed, rather than having to process a bytecode implementation of the function into a native code implementation. By marking the third party analytics function as native, when the third party analytics function is called, rather than calling its bytecode implementation, native code would be called instead. In addition, metadata associated with the third party analytics function may be called such that the native code that is invoked is the call handler of application modification SDK 312. Lastly, a copy of the bytecode implementation of the third party analytics function is created, which allows the functionality associated with the function to be executed without having to execute its actual bytecode implementation.

When the third party analytics function is called by main program 111 (or some other element or module), the metadata associated with the third party analytics function causes the call to be redirected to the call handler in application modification SDK 312, because the call handler is identified as the native implementation of the third party analytics function in the metadata. The call handler in application modification SDK 312 then processes the analytics function call to read the parameters or arguments included in the function call to extract the data associated with the user event detected by main program 311. Application modification SDK 312 can then utilize this information to perform its own analytics on the data.

After extracting the relevant data from the function call, the call handler function of application modification SDK 312 calls the third party analytics function in the same manner as initially attempted by main program 311. The call handler calls the third party analytics function so that the function's actual code implementation can run on the third party analytics module 313. Accordingly, third party analytics module 313 receives the function call and executes the function to generate analytics as initially intended by main program 311. After calling the third party analytics function, processing returns to main program 311.

While FIG. 3 illustrates a single operational sequence, it may be appreciated that the operations described herein operate routinely whenever the third party analytics function is called. That is, the third party analytics function is hooked such that each time the function is invoked, the call handler in application modification SDK 312 executes in its place. This technique could be used for any number of third party analytics functions associated with the same or different third party analytics programs.

Referring now to FIG. 4, a block diagram that illustrates computing system 400 in an exemplary implementation is shown. Computing system 400 provides an example of computing system 101 or any computing system that may be used to execute analytics data acquisition process 200 or variations thereof, although such systems could use alternative configurations. Computing system 400 includes processing system 401, storage system 403, software 405, communication interface 407, and user interface 409. Software 405 includes application 406 which itself includes analytics data acquisition process 200. Analytics data acquisition process 200 may optionally be implemented separately from application 406.

Computing system 400 may be representative of any computing apparatus, system, or systems on which application 406 and analytics data acquisition process 200 or variations thereof may be suitably implemented. Computing system 400 may reside in a single device or may be distributed across multiple devices. Examples of computing system 400 include mobile computing devices, such as cell phones, tablet computers, laptop computers, notebook computers, and gaming devices, as well as any other type of mobile computing devices and any combination or variation thereof. Note that the features and functionality of computing system 400 may apply as well to desktop computers, server computers, and virtual machines, as well as any other type of computing system, variation, or combination thereof.

Computing system 400 includes processing system 401, storage system 403, software 405, communication interface 407, and user interface 409. Processing system 401 is operatively coupled with storage system 403, communication interface 407, and user interface 409. Processing system 401 loads and executes software 405 from storage system 403. When executed by computing system 400 in general, and processing system 401 in particular, software 405 directs computing system 400 to operate as described herein for analytics data acquisition process 200 or variations thereof. Computing system 400 may optionally include additional devices, features, or functionality not discussed herein for purposes of brevity.

Referring still to FIG. 4, processing system 401 may comprise a microprocessor and other circuitry that retrieves and executes software 405 from storage system 403. Processing system 401 may be implemented within a single processing device but may also be distributed across multiple processing devices or sub-systems that cooperate in executing program instructions. Examples of processing system 401 include general purpose central processing units, application specific processors, and logic devices, as well as any other type of processing device, combinations, or variations thereof.

Storage system 403 may comprise any computer-readable storage media readable by processing system 401 and capable of storing software 405. Storage system 403 may include volatile and nonvolatile, removable and non-removable media implemented in any method or technology for storage of information, such as computer readable instructions, data structures, program modules, or other data. Storage system 403 may be implemented as a single storage device but may also be implemented across multiple storage devices or sub-systems co-located or distributed relative to each other. Storage system 403 may comprise additional elements, such as a controller, capable of communicating with processing system 401. Examples of storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the computer-readable storage media a propagated signal.

In operation, in conjunction with user interface 409, processing system 401 loads and executes portions of software 405, such as analytics data acquisition process 200, to facilitate acquisition of analytics data in a mobile application. Software 405 may be implemented in program instructions and among other functions may, when executed by computing system 400 in general or processing system 401 in particular, direct computing system 400 or processing system 401 to monitor for an analytics function call from main program code to third party analytics code. Software 405 may further direct computing system 400 or processing system 401 to intercept the analytics function call to redirect the analytics function call to a call handler function. Additionally, software 405 may direct computing system 400 or processing system 401 to, in the call handler function, process the analytics function call to extract analytics data from the analytics function call. Finally, software 405 may direct computing system 400 or processing system 401 to pass the analytics function call to the third party analytics code.

Software 405 may include additional processes, programs, or components, such as operating system software or other application software. Examples of operating systems include Windows®, iOS®, and Android®, as well as any other suitable operating system. Software 405 may also comprise firmware or some other form of machine-readable processing instructions executable by processing system 401.

In general, software 405 may, when loaded into processing system 401 and executed, transform computing system 400 overall from a general-purpose computing system into a special-purpose computing system customized to facilitate acquisition of analytics data in a mobile application as described herein for each implementation. For example, encoding software 405 on storage system 403 may transform the physical structure of storage system 403. The specific transformation of the physical structure may depend on various factors in different implementations of this description. Examples of such factors may include, but are not limited to the technology used to implement the storage media of storage system 403 and whether the computer-readable storage media are characterized as primary or secondary storage.

In some examples, if the computer-readable storage media are implemented as semiconductor-based memory, software 405 may transform the physical state of the semiconductor memory when the program is encoded therein. For example, software 405 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 400 is generally intended to represent a computing system with which software 405 is deployed and executed in order to implement application 406 and/or analytics data acquisition process 200 (and variations thereof). However, computing system 400 may also represent any computing system on which software 405 may be staged and from where software 405 may be distributed, transported, downloaded, or otherwise provided to yet another computing system for deployment and execution, or yet additional distribution. For example, computing system 400 could be configured to deploy software 405 over the internet to one or more client computing systems for execution thereon, such as in a cloud-based deployment scenario.

Communication interface 407 may include communication connections and devices that allow for communication between computing system 400 and other computing systems (not shown) or services, over a communication network 411 or collection of networks. In some implementations, communication interface 407 receives dynamic data 421 over communication network 411. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 409 may include a voice input device, a touch input device for receiving a gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface 409. In some examples, user interface 409 could include a touch screen capable of displaying a graphical user interface that also accepts user inputs via touches on its surface. The aforementioned user input devices are well known in the art and need not be discussed at length here. User interface 409 may also include associated user interface software executable by processing system 401 in support of the various user input and output devices discussed above. Separately or in conjunction with each other and other hardware and software elements, the user interface software and devices may provide a graphical user interface, a natural user interface, or any other kind of user interface. User interface 409 may be omitted in some implementations.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method to facilitate acquisition of analytics data in a mobile application, wherein an application modification software development kit (SDK) is installed into the mobile application, the method comprising:
    the application modification SDK marking a third party analytics function as native in metadata associated with the third party analytics function;
    the application modification SDK modifying the metadata associated with the third party analytics function to identify a call handler function of the application modification SDK as a native code implementation of the third party analytics function in the metadata instead of an actual native code implementation of the third party analytics function, wherein an analytics function call from main program code of the mobile application to the third party analytics function is intercepted and redirected to the call handler function of the application modification SDK by virtue of the metadata;
    in the call handler function, processing the analytics function call to extract analytics data from the analytics function call; and
    passing the analytics function call to third party analytics code associated with the third party analytics function.

2. The method of claim 1 wherein the analytics function call from the main program code to the third party analytics function is triggered by a user interaction with the mobile application.

3. The method of claim 1 wherein passing the analytics function call to the third party analytics code comprises calling a copy of a bytecode implementation of the third party analytics function.

4. The method of claim 3 wherein the application modification SDK creates the copy of the bytecode implementation of the third party analytics function.

5. The method of claim 1 wherein processing the analytics function call to extract the analytics data from the analytics function call comprises processing the analytics function call to interpret a string that identifies an event and a payload.

6. The method of claim 1 further comprising processing the analytics data extracted from the analytics function call to determine independent analytics on the analytics data.

7. The method of claim 6 further comprising processing the independent analytics to generate an analytics report for presentation to a user.

8. One or more computer-readable storage media having program instructions stored thereon to facilitate acquisition of analytics data in a mobile application having an application modification software development kit (SDK) installed into the mobile application, wherein the program instructions, when executed by a computing system, direct the computing system to at least:
    in the application modification SDK, mark a third party analytics function as native in metadata associated with the third party analytics function;
    in the application modification SDK, modify the metadata associated with the third party analytics function to identify a call handler function of the application modification SDK as a native code implementation of the third party analytics function in the metadata instead of an actual native code implementation of the third party analytics function, wherein an analytics function call from main program code of the mobile application to the third party analytics function is intercepted and redirected to the call handler function of the application modification SDK by virtue of the metadata;
    in the call handler function, process the analytics function call to extract analytics data from the analytics function call; and
    pass the analytics function call to third party analytics code associated with the third party analytics function.

9. The one or more computer-readable storage media of claim 8 wherein the analytics function call from the main program code to the third party analytics function is triggered by a user interaction with the mobile application.

10. The one or more computer-readable storage media of claim 8 wherein the program instructions direct the computing system to pass the analytics function call to the third party analytics code by directing the computing system to call a copy of a bytecode implementation of the third party analytics function.

11. The one or more computer-readable storage media of claim 10 wherein the application modification SDK creates the copy of the bytecode implementation of the third party analytics function.

12. The one or more computer-readable storage media of claim 8 wherein the program instructions direct the computing system to process the analytics function call to extract the analytics data from the analytics function call by directing the computing system to process the analytics function call to interpret a string that identifies an event and a payload.

13. The one or more computer-readable storage media of claim 8 wherein the program instructions further direct the computing system to process the analytics data extracted from the analytics function call to determine independent analytics on the analytics data.

14. The one or more computer-readable storage media of claim 13 wherein the program instructions further direct the computing system to process the independent analytics to generate an analytics report for presentation to a user.

15. An apparatus comprising:
one or more computer-readable storage media; and
a mobile application comprising program instructions, the program instructions stored on the one or more computer-readable storage media that, when executed by a processing system, direct the processing system to at least:
mark a third party analytics function as native in metadata associated with the third party analytics function;
modify the metadata associated with the third party analytics function to identify a call handler function as a native code implementation of the third party analytics function in the metadata instead of an actual native code implementation of the third party analytics function, wherein an analytics function call from main program code of the mobile application to the third party analytics function is intercepted and redirected to the call handler function by virtue of the metadata;
in the call handler function, process the analytics function call to extract analytics data from the analytics function call; and
pass the analytics function call to third party analytics code associated with the third party analytics function.

16. The apparatus of claim 15 wherein the analytics function call from the main program code to the third party analytics function is triggered by a user interaction with the mobile application.

17. The apparatus of claim 15 wherein the program instructions direct the processing system to pass the analytics function call to the third party analytics code by directing the processing system call a copy of a bytecode implementation of the third party analytics function.

18. The apparatus of claim 17 wherein the program instructions direct the processing system to create the copy of the bytecode implementation of the third party analytics function.

19. The apparatus of claim 15 wherein the program instructions direct the processing system to process the analytics function call to extract the analytics data from the analytics function call by directing the processing system to process the analytics function call to interpret a string that identifies an event and a payload.

20. The apparatus of claim 15 wherein the program instructions further direct the processing system to process the analytics data extracted from the analytics function call to determine independent analytics on the analytics data and process the independent analytics to generate an analytics report for presentation to a user.

* * * * *